United States Patent [19]
Degnan

[11] 3,730,600
[45] May 1, 1973

[54] COLLAPSIBLE SHIM FOR PRELOADED BEARING AND METHOD OF MAKING SAME

[75] Inventor: William G. Degnan, Huntington, Conn.

[73] Assignee: United Aircraft Corporation, East Hartford, Conn.

[22] Filed: Feb. 9, 1972

[21] Appl. No.: 224,739

[52] U.S. Cl. .................................................308/244
[51] Int. Cl. ...............................................F16c 33/00
[58] Field of Search..............................308/244, 238

[56] References Cited
UNITED STATES PATENTS
1,383,035   6/1921   Short..................................308/244

Primary Examiner—Charles J. Myhre
Assistant Examiner—Frank Susko
Attorney—Maurice B. Tasker et al.

[57] ABSTRACT

An antifriction bearing capable of being preloaded comprises a plurality of stacked bearing units each including an inner race mounted on a shaft and an outer race supported in a housing and a clamping device which provides retention of the bearing assembly with any desired internal load in the separate bearing units. A resin impregnated fiberglass shim is located between the clamping device and an adjacent bearing race which collapses upon the increased heat and load resulting from a lubrication failure. Collapse of the shim reduces the internal load on the bearing. The shim is supported between two plates, one of which has a recess partly receiving the shim. Means is also provided for preventing outward collapse of the shim when this would be undesirable.

9 Claims, 9 Drawing Figures

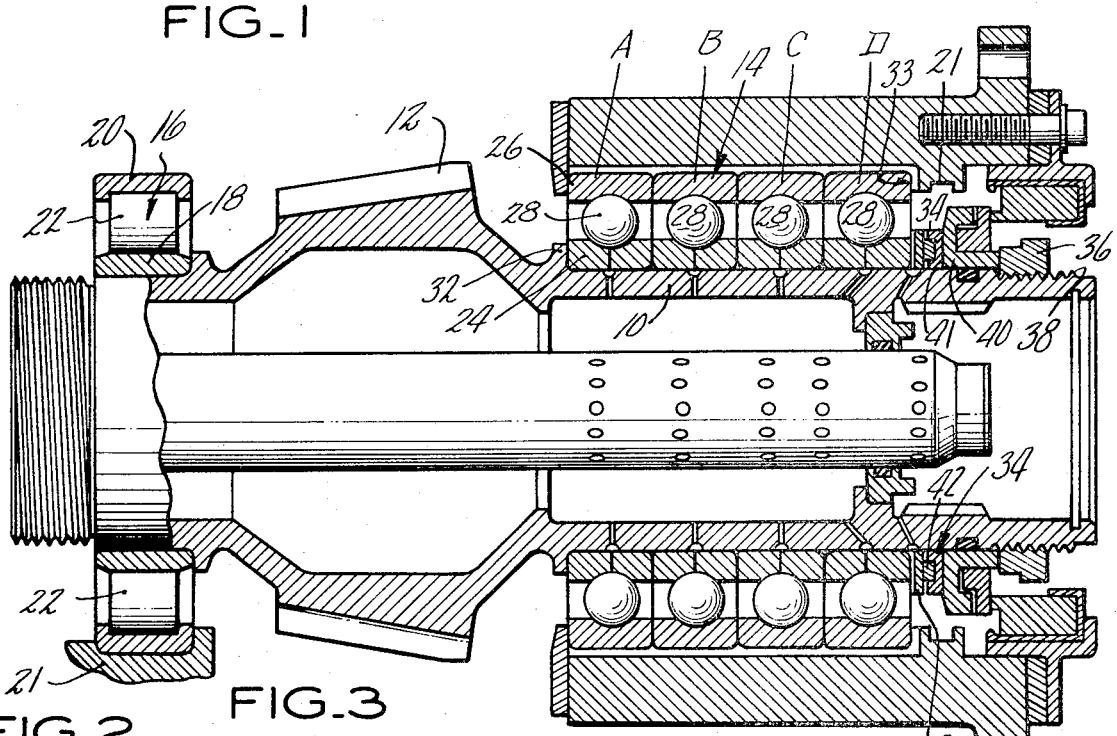
PATENTED MAY 1 1973
3,730,600

3,730,600

COLLAPSIBLE SHIM FOR PRELOADED BEARING AND METHOD OF MAKING SAME

The invention described herein was made in the course of or under a contract or sub-contract thereunder with the Department of the U. S. Army.

BACKGROUND OF THE INVENTION

1. Field of the Invention

This invention relates to antifriction bearings, sometimes referred to as rolling contact bearings, which may utilize either balls or rollers between inner and outer races. The invention is particularly concerned with heavily loaded transmission stack-bearings which are capable of being preloaded. In the event of overheating of the transmission assembly due to external causes, i.e., due to loss of lubricant as a result of ballistic impact of the transmission housing, the internal bearing geometry is changed as a result of differential thermal expansion of the component parts which cause increased loads on the bearing elements. This further aggravates the heating differential expansion effects and this sequence soon results in seizure and failure of the bearing.

2. Description of the Prior Art

In U.S. Pat. No. 3,528,713, issued Sept. 15, 1970 to Keller and Jones and assigned to the assignee of this application, a fusible shim is disclosed in such a preloaded stack-bearing environment. The instant invention is an improvement over the shim of this patent and reference is made to this patent for a better understanding of the present invention.

It was found that in the main angle-gear-drive gear box located in the nose of a helicopter the prior shim was subject to creep at the normal operating temperature which eventually resulted in failure of the shim, necessitating replacement of the shim. The shim of the present invention overcomes this difficulty.

SUMMARY OF THE INVENTION

It is an object of this invention to provide an improved shim, or washer, for use in a preloaded bearing environment which is free from creep during normal elevated operating temperatures of the bearing, but which collapses to relieve the preload in short-time creep and instability upon overheating of the bearing and increase of load.

A further object of this invention is to provide a shim assembly for use in preloaded bearings including shim-supporting plates on opposite sides of the shim, one of which has a groove to partly receive the shim.

More specifically it is an object of this invention to provide a resin-impregnated fiberglass cloth shim between the bearing and the clamping member which provides the preload for the bearing and an improved method of making such a shim.

Another object of this invention is to provide a band about the unsupported periphery of the shim for preventing the shim from collapsing outward into the bearing.

A further object of this invention is to provide a composite shim for preloaded bearings which is in the form of a narrow ring and to provide improved means for supporting said ring.

A still further object of this invention is generally to improve the construction and performance of collapsible shims for preloaded bearings.

BRIEF DESCRIPTION OF THE DRAWINGS

FIG. 1 is a longitudinal sectional elevation through a preloaded bearing equipped with the improved shim assembly of the invention;

FIG. 2 is a similar sectional elevation of the shim and its left and right-hand plate supporting structure on an enlarged scale;

FIG. 3 is an end view of the left-hand shim-supporting plate;

FIG. 4 is an enlarged fragmentary cross-sectional view taken on the line 4—4 of FIG. 3;

FIG. 5 is an end view of the right-hand shim supporting plate;

FIG. 6 is an enlarged sectional view of the right-hand shim supporting plate taken on the line 6—6 of FIG. 5;

FIG. 7 is an end view of a modified form of the collapsible shim;

FIG. 8 is a section on an enlarged scale on line 8—8 of FIG. 7; and

FIG. 9 is an enlarged fragmentary view showing a modified construction of the right-hand shim-supporting plate.

DESCRIPTION OF THE PREFERRED EMBODIMENT

In FIG. 1 a hollow shaft 10 has formed integral therewith one of the mating gears 12 of a pair of bevel gears. Gear 12 may be formed integral with the shaft, as shown, or may be separately formed and keyed to the shaft. Shaft 10 is mounted for rotation in two bearings generally indicated by 14 and 16 located respectively at the right and left-hand side of gear 12.

Bearing 16 is a typical cylindrical roller bearing having an inner race 18 mounted on shaft 10 and an outer race 20 installed in an enclosing casing 21. Rollers 22 are provided between races 18 and 20 in a usual manner. Bearing 16 is a conventional roller bearing designed to take radial loads only.

Bearing 14 is a stack-bearing assembly consisting of a four-bearing set of split-inner-race ball bearings indicated as A, B, C and D of a type designed to take both axial loads and radial loads. Each bearing of the set consists of an annular split inner race 24 mounted on shaft 10 and an annular outer race 26 installed in casing 21 which supports the shaft. Races 24 and 26 have confronting annular grooves to receive balls 28. It will be noted that the four ball bearings A, B, C and D comprising the assembly 14 are stacked on shaft 10 with their inner and outer races abutting and with the inner race of bearing unit A abutting a shoulder 32 on shaft 10 and the outer race of bearing unit D abutting a shoulder 33 on casing 21. In this way the axial thrust of shoulder 32 on shaft 10 is transmitted through the several bearing units to shoulder 33 on casing 21. The inner bearing race of unit D is clamped against the inner races of the bearing units by a clamping nut 36 threaded onto the threaded portion 38 of shaft 10 through a new shim assembly, generally indicated as 34 (FIG. 2). Nut 36 engages one face of an intermediate annular member 40 which has an opposite flat face 41 suitable for engaging shim assembly 34. By means of nut 36 a suitable preload can be placed on bearing assembly 14.

This invention is concerned with the shim assembly 34 and particularly with shim 42 and the method of making it. Referring to FIG. 2 which shows the assembly in longitudinal sectional elevation, 42 is the collapsible shim which is rectangular in cross section and ring shaped, 44 is the left-hand supporting plate for the shim (FIGS. 3 and 4), and 46 is the right-hand supporting plate (FIGS. 5 and 6). Left-hand plate 44 has a flat annular face 48 (FIG. 4) which engages one side of shim 42. Its opposite face 50 which engages the inner race of ball bearing D is provided with two pairs of diametrically opposite, equally spaced radial lubrication grooves 52. Right-hand shim supporting plate 46 has a flat face 54 which engages face 41 of annular member 40 and an opposite face 56 provided with an annular groove 58 which receives a major portion of shim 42. Shim 42, however, is thicker in an axial direction than the depth of groove 58 with the result that face 56 of right-hand plate 46 is slightly spaced from adjacent face 48 of left-hand plate 44 when the shim is in the groove. This spacing is indicated in FIG. 2 as 60. By reason of this greater thickness of shim 42 the latter is subjected to the full clamping pressure of nut 36 in preloading the bearing assembly but is supported both axially and radially.

In FIGS. 7 and 8 shim 42 is shown provided with a carbon band 62 about its periphery which, upon collapse of the shim, prevents any of the material of the shim from getting into the bearing races. In other words it insures the shim will collapse inward.

FIG. 9 shows a modification in which the groove 58a is made greater radially than the radial dimension of the shim. The radial thickness of the recess 58a is designed to be greater than that of the shim so as to allow the gap 60 to close fully, enclosing the full collapsed shim.

THE METHOD

The prime element in this bearing assembly is shim 34, a composite ring, wound in a filamentary manner from a continuous, narrow strip of glass cloth impregnated and stabilized by a high temperature epoxy resin. The glass cloth provides short lateral columns of glass yarn (woof) supported by continuous glass yarn at right angles (warp). The short woof yarns act stiffly as columns, stabilized by the resin, carrying the compressive load of the bearing preload. The shim is formed by winding the narrow strip of preimpregnated cloth repeatedly upon itself on a narrow spool. As an alternate material standard fiberglass cloth may be used, with resin being applied as the cloth is wound on the spool. The wound, impregnated cloth is then cured under temperature and pressure. The resin system used, in the embodiment shown, to stabilize the glass cloth is Hexell F-161 as defined by specification MIL-R-9300 which cross links and stabilizes at the normal operating temperature of the gear box (300° F). Other resins may be used as temperature and pressure conditions in the bearing environment vary. When cured, the shim is machined radially to a dimension so that is fits groove 58 in plate 46 to have a width to provide adequate spacing into which the collapsed shim may be pressed.

OPERATION

If the oil supply in gear case 21 fails, the stresses in shim 42 rise as well as the temperature, and the composite shim fails in compression in a short-time creep mode induced both by the rising stress and the rising temperature. The temperature rises more slowly than the stress, so while the temperature rise causes the strength of the glass fiber columns to deteriorate, the shim fails, not by fusion, but by compressive failure. In normal operation the short woof oriented yarns act stiffly as columns which are stabilized by the warp yarns and the resin. Under abnormal conditions the buckling strength of the columns is reduced by the increased heat, and they collapse under the increased load. There is a deterioration of the resin at the higher temperature which, under high compressive loading, causes the columns to collapse.

The carbon band 62, if used, is preferably a high-strength roving of graphite tow or graphite cloth wound on the outer periphery of the composite shim, thus covering the area directly opposite the open space 60 between the two confronting faces of plates 44 and 46. This is intended to preclude bits of glass fiber escaping from the shim assembly upon collapse of the shim contaminating the bearings in the transmission.

SUMMARY

Features believed to be broadly new include the use of the heat-distortion (short-time creep) properties of a composite material to induce a failure of the shim which will allow structural components of the transmission to continue service under adverse conditions; tailoring properties of the shim assembly so that a small difference in operating conditions precipitates an unstable condition and immediate failure of the shim, while still allowing safe flight to landing; combination of failure modes to cause failure to such a degree that an appreciable translation can occur and the required motion of the bearing inner races can be obtained; starting of the failure of the shim by heat distortion (short-time creep) warping the fill fibers (woof) of a composite shim in the process, and continuing the failure at an accelerated rate by reason of the misaligned fibers and continued heat distortion of the material.

I do not desire to be limited to the exact details of construction shown and described herein, for obvious modifications will occur to a person skilled in the art. For example, more advanced composites could be used such as graphite or alternate methods of fabric weave. The shim disclosed herein uses satin weave which allows maximum straightness of fill direction fibers (woof). The standard square weave might be used, trading off straightness of fill fibers against support. It is also possible to use "S" glass rather than the cheaper "E" glass used herein and obtain a higher modulus of elasticity, thus allowing higher loads to be carried in the same dimensional envelop.

I claim:

1. A collapsible shim assembly for preloaded bearings including left and right-hand plates having an axial passage for a shaft and a ring-shaped collapsible shim of composite material located between the confronting faces of said plates, one of said plates having a groove in its confronting face to receive said shim, said groove having an axial depth which is less than the axial dimension of said shim.

2. The combination of claim 1 in which the radial dimension of the groove which receives the shim is greater than the radial dimension of the shim.

3. The combination of claim 1 in which the ring-shaped shim has a generally rectangular cross section and consists of a plurality of resin impregnated layers of narrow fiberglass cloth in which the woof yarns are transverse to the confronting faces of said plates and normally act stiffly as columns compressed by the preload.

4. A collapsible shim for preloaded bearings comprising a ring of resin impregnated fiberglass cloth in which the woof yarns are axially disposed and the warp yarns are circumferentially disposed.

5. A collapsible shim for preloaded bearings comprising a composite ring wound in a filamentary manner from narrow glass cloth stabilized by a high temperature resin, in which the short woof yarns of the shim act stiffly as columns carrying the compressive force of the bearing preload.

6. A collapsible shim for preloaded bearings comprising a composite ring of resin impregnated fiberglass cloth arranged in circumferential layers in which the short woof yarns are axially disposed and the warp yarns are circumferentially disposed.

7. A collapsible shim for preloaded bearings comprising a composite ring including a plurality of circumferentially disposed layers of resin impregnated fiberglass cloth which is stable and creep-free at normal bearing temperatures and which becomes unstable in short-time creep at an abnormally high temperature resulting in collapse of said shim due to the bearing preload.

8. A collapsible shim for preloaded bearings comprising a composite ring including a plurality of circumferentially disposed layers of resin impregnated cloth providing a multitude of short lateral columns of glass yarn (woof) supported by continuous glass yarn (warp) running circumferentially at right angles thereto, said short woof yarns acting stiffly as columns stabilized by the resin and carrying the compressive force of the bearing preload.

9. The combination of claim 8 in which means is provided for directing the fragments of the shim inward upon collapse including a band of carbon on the periphery of said ring.

* * * * *